(12) United States Patent
Willey et al.

(10) Patent No.: US 8,644,860 B2
(45) Date of Patent: Feb. 4, 2014

(54) APPARATUS, AND ASSOCIATED METHOD, FOR PAGING A MOBILE STATION WITH PAGE ADDRESSES UPON A PAGING CHANNEL

(75) Inventors: William Daniel Willey, Gilroy, CA (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1509 days.

(21) Appl. No.: 12/013,331

(22) Filed: Jan. 11, 2008

(65) Prior Publication Data

US 2009/0181701 A1    Jul. 16, 2009

(51) Int. Cl.
*H04W 68/00* (2009.01)
*H04W 4/00* (2009.01)

(52) U.S. Cl.
USPC ........................................ 455/458; 455/432.2

(58) Field of Classification Search
USPC .......................................... 455/51, 458, 432.2
See application file for complete search history.

(56) References Cited

U.S. PATENT DOCUMENTS

| | | | |
|---|---|---|---|
| 6,363,242 B1 | 3/2002 | Brown, Jr. et al. | |
| 6,421,540 B1 | 7/2002 | Gilhousen et al. | |
| 6,542,752 B1 | 4/2003 | Illidge | |
| 6,731,943 B1 * | 5/2004 | McCormick et al. | 455/458 |
| 6,795,425 B1 * | 9/2004 | Raith | 370/345 |
| 7,177,654 B2 * | 2/2007 | Stenberg | 455/458 |
| 7,711,377 B2 | 5/2010 | Laroia et al. | |
| 2004/0152476 A1 | 8/2004 | Kuwano et al. | |
| 2004/0227618 A1 | 11/2004 | Hwang et al. | |
| 2005/0186959 A1 * | 8/2005 | Vialen et al. | 455/432.1 |
| 2006/0104225 A1 | 5/2006 | Kim et al. | |
| 2006/0148493 A1 | 7/2006 | Narasimha et al. | |
| 2007/0015523 A1 | 1/2007 | Prakash et al. | |
| 2007/0082683 A1 | 4/2007 | Na et al. | |
| 2008/0032713 A1 | 2/2008 | Yang | |
| 2008/0182596 A1 | 7/2008 | Wang et al. | |
| 2008/0188247 A1 | 8/2008 | Worrall | |
| 2010/0202382 A1 * | 8/2010 | Park et al. | 370/329 |

FOREIGN PATENT DOCUMENTS

| | | |
|---|---|---|
| EP | 1283648 A1 | 2/2003 |
| EP | 1608195 A1 | 12/2005 |
| EP | 1638212 A3 | 8/2006 |

OTHER PUBLICATIONS

Office Action issued in Canadian Application No. 2,714,059 on Oct. 3, 2012; 3 pages.
Extended European Search Report issued in European Application No. 08152384.7 on Oct. 8, 2008; 5 pages.
International Search Report and Written Opinion of the International Searching Authority issued in International Application No. PCT/US2009/030625 on Jun. 26, 2009; 10 pages.
International Preliminary Report on Patentability issued in International Application No. PCT/US2009/030625 on Feb. 15, 2011; 4 pages.

* cited by examiner

*Primary Examiner* — Kamran Afshar
*Assistant Examiner* — Omoniya Obayanju
(74) *Attorney, Agent, or Firm* — Fish & Richardson P.C.

(57) ABSTRACT

An apparatus and a method for facilitating paging of a mobile station in a multi-user communication system. A page message is generated that includes page addresses of mobile stations that are to be paged. The page addresses are shortened addresses, if possible, that are selected to unambiguously identify the paged mobile stations. The page message includes page addresses of corresponding lengths and of unequal values.

7 Claims, 11 Drawing Sheets

APPARATUS, AND ASSOCIATED METHOD, FOR PAGING A MOBILE STATION WITH PAGE ADDRESSES UPON A PAGING CHANNEL

The present disclosure relates generally to a manner by which to page a mobile station in a multi-user system to alert the mobile station of a pending communication service. More particularly, the present disclosure relates to an apparatus and an associated methodology by which to form a page message that includes a page address of the mobile station that permits the mobile station to be uniquely identified.

The paging message is formed that includes page addresses of mobile stations that are paged. The page addresses are, if possible, short addresses that are of shortened lengths which still permit the mobile station that is intended to be paged to be unambiguously alerted to the pending communication service. By unambiguously identifying the mobile station, an erroneous response by a mobile station responsive to a page message is less likely to occur.

BACKGROUND OF THE INVENTION

Technological advancements have, through the course of history, brought about many changes that have benefited almost all aspects of human endeavor. Advancements in communication technologies have permitted the development and deployment of many varied types of communication systems. Their implementation has permitted the improved communication capacities of existing communication systems and the introduction of communication systems. Communications are possible at almost any location, between widely-dispersed parties, and provide many varied types of communication services.

Cellular, and cellular-like, mobile communication systems are exemplary of communication systems made possible as a result of advancements in communication technologies. Successive generations of cellular communication systems have been developed and deployed with each generation taking advantage of available communication technologies. While early-generation communication systems provided primarily voice communication services and only limited data communication services, newer-generation systems provide increased data services. Cellular mobile radio communication systems are, as a result, increasingly used, not just for voice services, but also for data communication services.

Communications are typically carried out by a user through use of a mobile station. A mobile station is a radio transceiver, typically of dimensions permitting its convenient carriage and operation by the user. The mobile station is powered by a portable power supply that is carried together with, and forms part of, the mobile station. The portable power supply stores a finite amount of energy. During operation of the mobile station, the stored energy of the portable power supply is depleted, and the power supply must be recharged or replaced once the stored energy is depleted to an extent that limits, or prevents, the continued operation of the mobile station. To increase the operational period of a mobile station, efforts are made to reduce its energy requirements.

For instance, efforts are made to maintain the mobile station in a low-power mode in which circuit parts of the mobile station are not powered, except when needed. Schemes have been developed, e.g., relating to monitoring, by a mobile station, for a pending communication service for reducing power consumption. For example, a mobile station is maintained in the low-power, sometimes referred to as a sleep mode, but the mobile station periodically wakes up to monitor a paging channel to determine whether the mobile station is paged. If the mobile station is not paged, the mobile station returns to a sleep, or other low-power, mode, thereby to minimize power dissipation.

The page of the mobile station must appropriately identify the mobile station so that the mobile station is aware that it, and not a different mobile station, is being paged. At least one proposed system provides for a two-stage paging scheme in which two different channels are used to send a page to page a mobile station. The 3GPP ($3^{rd}$ Generation Partnership Project) is considering proposals for a new air interface, referred to as Long Term Evolution (LTE). In the proposed paging scheme, the mobile station, referred to as a UE (User Equipment), wakes up and monitors a first channel. Assignment information, if sent thereon, provides information usable by the UE to then monitor the second paging channel. Proposals provide for the communication on the first paging channel of a group address, referred to as a PI-RNTI (Paging Indication Radio Network Temporary Identifier). More than one UE might share the same address. Any UE that detects the group address communicated on the first paging channel then also monitors the second paging channel for a page message sent thereon. In one existing proposal, a unique identifier, such as a 32-bit TMSI (Temporary Mobile Station Identity), is sent on the second paging channel to page the mobile station. Because the unique identifier uniquely identifies the UE, only the UE that is intended to be paged is paged by the transmission. The second paging channel is, however, also used for traffic services, such as the communication of voice traffic or data traffic. The use of a lengthy, unique identifier to identify the UE that is paged therefore comes at the expense of capacity on the channel also to be used for a traffic service.

If a manner could be provided by which to provide for paging of a mobile station on the second paging channel that provides increased capacity on the channel for traffic services while still uniquely identifying the mobile station improved communication operations would be provided.

It is in light of this background information related to paging by an access network of an access terminal that the significant improvements of the present disclosure have evolved.

BRIEF DESCRIPTION OF THE DRAWINGS

FIGS. 9 and 10 illustrate representations of exemplary formats of exemplary addresses used pursuant to an embodiment of the present disclosure.

DETAILED DESCRIPTION

Figure 1:
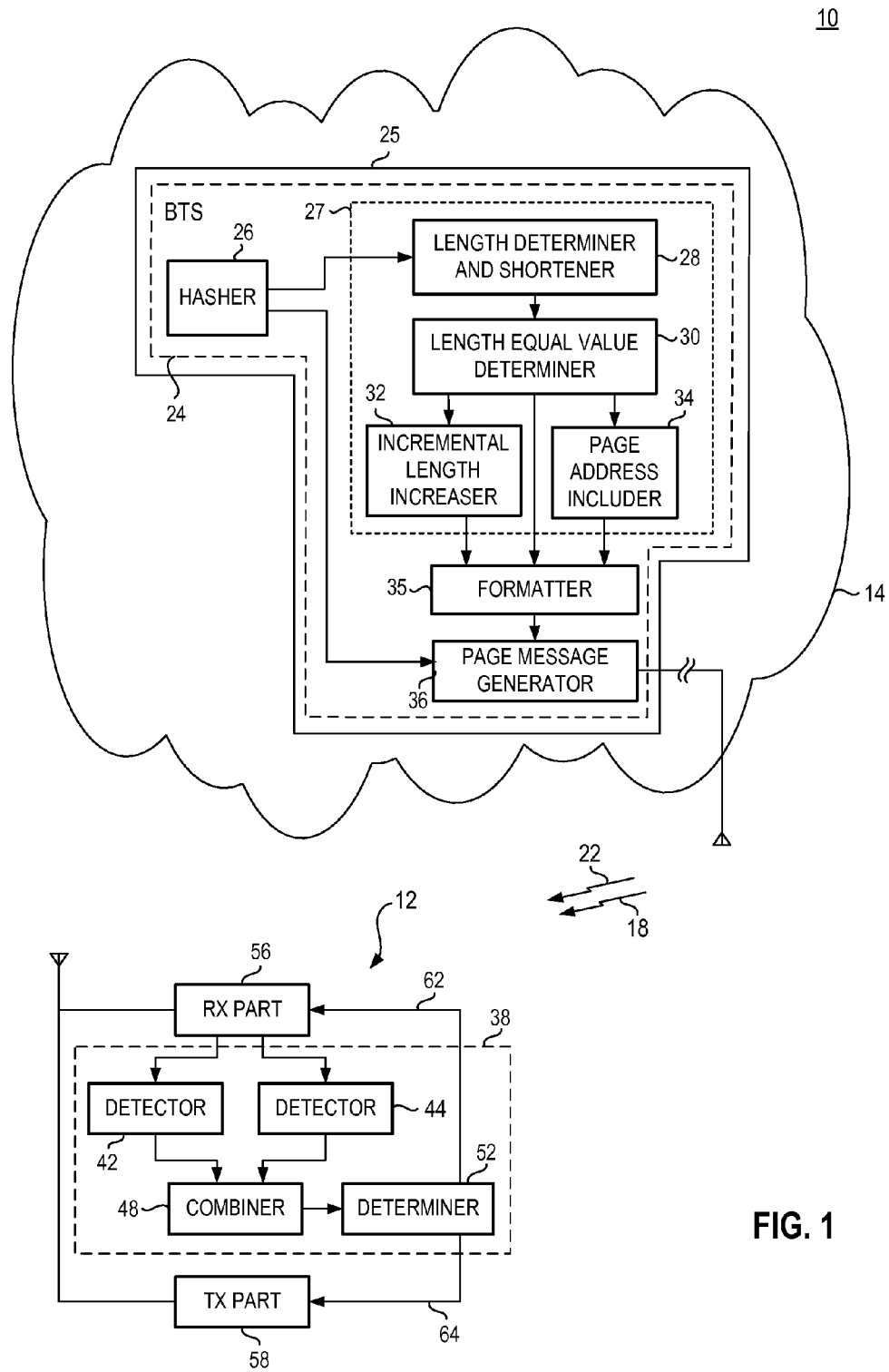
FIG. 1 illustrates a functional block diagram of a radio communication system in which an embodiment of the present disclosure is operable.

The present disclosure, accordingly, advantageously provides an apparatus, and an associated methodology, by which to page a mobile station in a multi-user system to alert the mobile station of a pending communication service. Through operation of an embodiment of the present disclosure, a manner is provided by which to form a page message that includes a page address of the mobile station that permits the mobile station to be uniquely identified.

By uniquely identifying the mobile station in the paging of the mobile station, the mobile station does not incorrectly respond to a page that is not intended for the mobile station. And, by using short addresses when possible, additional channel capacity is made available for traffic communication purposes.

In another aspect of the present disclosure, the bits that are sent, pursuant to a two-page paging scheme, together include all of the bits that uniquely define the mobile station that is paged. The bits that are sent together define, for instance, a TMSI, an IMSI, or other value that uniquely identifies the mobile station. Thereby, through appropriate recombination of the bits that are sent pursuant to the two-stage paging scheme, the mobile station is able to recreate the unique identifier that is sent and to determine whether the mobile station is paged.

In another aspect of the present disclosure, the unique identifier that uniquely identifies a mobile station that is to be paged is hashed to hash a first group of bits of the identifier to a first paging message and to hash a second group of the bits of the identifier to a second paging message. Multiple, non-contiguous portions of the identifier are hashed to form the separate paging messages. Because noncontiguous portions of the unique identifier are used in the hashing, problems that might otherwise result from the use of contiguously-positioned values of the unique identifier are avoided.

In another aspect of the present disclosure, when implemented in a 3GPP LTE system, the hashings that form the first group of hashed bits form a group address, a PI-RNTI value. And, the hashed bits that form the second group form a short address. The group address is sent on a first channel, e.g., a DL-CCH (Down Link Control Channel), and the second group is sent on a second channel, e.g., a PCH (Paging Channel). The first group and the second group together comprise all of the unique identifiers that uniquely identify the mobile station. If the unique identifier is 32 bits, the first group may comprise, 16 bits, and the second group comprises the remaining 16 bits.

In another aspect of the present disclosure, the hashing of the unique identifier of the mobile station is performed to create three groups of the bits hashed from the identifier. A first group of hashed bits forms the group address, a second group forms a short address, and a third group forms a third address. The number of hashed bits of the three groups together correspond to the bits of the unique identifier.

In another aspect of the present disclosure, a single group address is used for all mobile stations. And, the group address is set to a value that is the same, for all individually directed pages, e.g., the group address is set to be 0xffff. The unique identifier of the mobile station is hashed to form a first short address and a second address.

In another aspect of the present disclosure, the mobile station wakes up to detect whether the group address associated therewith is sent on a first paging channel, such as a DL-CCH. And, the mobile station further monitors the second paging channel to detect whether a short address is communicated thereto.

In another aspect of the present disclosure, the mobile station combines the bits detected on the two paging channels and determines whether the mobile station has been paged by determining whether the combined bits correspond to the bits of the unique identifier of the mobile station.

Because fewer than all of the bits of the unique identifier are sent on the second paging channel, additional capacity is provided on the second paging channel for the performance of traffic communication services. The result is improved efficiency of use of spectrum allocated to the communication system.

In these and further aspects, an apparatus, and an associated methodology, is provided for facilitating mobile-station paging. A page format selector is configured to select page address lengths of each page address to be included in a page message. The page address lengths are selected to be of minimum lengths that provide page addresses of dissimilar values. A formatter is configured to format a page message with page addresses of page address lengths selected by the page format selector.

In these and other aspects, further apparatus, and an associated methodology, is provided for facilitating paging of a mobile station. A detector is configured to detect a page message. The page message has page addresses of corresponding lengths and are of dissimilar values. A determiner is configured to determine whether the mobile station is paged responsive to detection of the page message.

Referring first, therefore, to FIG. 1, a radio communication system, shown generally at 10, provides radio communications to mobile stations, of which the mobile station 12 is representative. The communication system, in the exemplary implementation, forms a 3GPP ($3^{rd}$ Generation Partnership Project) LTE (Long Term Evolution) system that provides for both voice and data communication services. By, and with, mobile stations, such as the mobile station 12.

When a communication service is to be performed with a mobile station, the mobile station is first paged. Paging of the mobile station alerts the mobile station of the pending communication service. And, in response, if the communication service is accepted, the mobile station enters into a state to permit its operation pursuant to the performance of the communication service.

As mentioned previously, a two-stage paging method is to be provided. That is to say, when paging a mobile station, hereinafter referred to as a UE (User Equipment) the infrastructure uses two different channels to send a page. Page messages, originated at the network 14, are sent upon channels defined upon a radio air interface that extends beyond the network 14 and the mobile stations. While the following description shall describe exemplary operation in which the communication system forms a 3GPP LTE system, the teachings set forth herein are analogously implementable in other types of communication systems.

Pursuant to paging in the 3GPP LTE—compliant system, the UE is assigned to a certain paging occasion within a DRX (Discontinuous Reception) cycle. The UE 12 wakes up and turns on its receiver and first receives a control channel, referred to as an L1/L2 control channel, a PD-CCH (Physical Downlink Control Channel), or a Downlink Control Channel (DL-CCH). The DL-CCH includes resource block assignment information. The resource block assignment may include information such as the frequency and time to indicate to the UE in what manner to receive the associated paging message. Then, the paging message is sent on a PCH (Paging Channel) transport channel. The PCH transport channel is mapped to a PDSCH (Physical Downlink Shared Channel) physical channel.

A group address is used on the DL-CCH. The group address is sometimes referred to as a PI-RNTI. When paging a UE, the network is aware of the PI-RNTI of the UE that is to be paged, and the network uses the address to form the content of the DL-CCH message. In 3GPP specification number 36.212v200, a 16-bit cyclic redundancy check (CRC) is used for error detection of the DL-CCH. This section also specifies that, for the DL-CCH message, an exclusive OR operation is performed on the computed CRC, and an identity, i.e., the PI-RNTI. The result of the exclusive OR operation is appended to the payload. Then both the PI-RNTI and the result of the exclusive OR (EOR) operation are sent on the DL-CCH. Due to the exclusive OR operation, a UE that receives the transmitted message is not able to decode the content that is intended for another UE that has another PI-RNTI.

The DL-CCH is represented by the arrow 18, and the PCH is represented by the arrow 22. The channels are defined upon the radio air interface and are monitored by the UE 12 in manners as noted above. As also noted above, the PDSCH on which the PCH is sent is also used for traffic services to communicate voice and data traffic. An embodiment of the present disclosure provides a manner by which to increase the portion of the PDSCH that is available for communication of traffic data.

An apparatus 24 is embodied at a network entity, here a base transceiver station 25. The apparatus 24 operates, amongst other things, to page UEs, such as the UE 12 of a pending communication service. Paging is performed pursuant to a two-stage paging process. The apparatus 24 provides a manner by which to form a PCH page and unambiguously provides a paged UE within a page using short addresses to alert the UE of a pending communication service. The apparatus 24, in the exemplary implementation, is embodied at a Base Transceiver Station (BTS) 25. The apparatus is here shown to include a hasher 26, a page format selector 27 having a length determiner and shortener 28, a length equal value determiner 30, an incremental length increaser 32, and a page address includer 34. The apparatus further includes a formatter 35 and a page message generator 36. The elements of the apparatus 24 are functionally represented, implemented in any desired manner, including by algorithms executable by processing circuitry. That is to say, the apparatus 24, in one implementation, is implemented by a processor having algorithms that are executed thereat. While the apparatus 24 is here shown to be embodied at a single network entity, in other implementations, the elements are distributed amongst more than one entity. The hasher 26 operates to hash bits of a unique identifier, such as a TMSI, IMSI, or other value to provide a first group of the hashed bits to the page message generator 36 for communication upon the DL-CCH 18. And, a second group of the hashed bits are used for communication upon the PCH 22.

The group of hashed bits that are to be communicated upon the PCH are provided by the hasher 26 to the page format selector 27 along with corresponding hashed bits associated with other UEs that are to be paged. The determiner and shortener 28 operates to determine the lengths of the groups of bits provided thereto and selectably to shorten the lengths of one or more groups of bits such that all of the groups, i.e., values, are of the same lengths. That is to say, the number of bits of each group is the same. The determiner 30 operates to compare the values of the shortened groups that are to form page addresses and from the comparison determines whether more than one of the groups are of equal values. If none are of equal values, the shortened values are provided to the formatter 35 to be formatted and to be provided to a page message generator 36.

In one implementation, if the determiner 30 determines more than one of the page addresses, i.e., groups of hashed bits, to be of the same values, then operation of the incremental length increaser 32 is invoked to increase the lengths of the addresses so as to be dissimilar. The process is iterative, if needed. The length is increased a minimum number of bits to obtain addresses that are of the dissimilar values.

In another implementation, if the page address values are determined by the determiner 30 to be equal, operation of the page address includer 34 is invoked. The page address includer 34 operates to select which page addresses to permit to be included in a page message. The selection made by the includer 34 is to permit a page message to include only page addresses of dissimilar values. Selection is made to allocate addresses that are of the same values to different page messages. Results are provider to the formatter 35 responsive to the alternate, or combinational, operations of the length increaser 32 and the page address includer 34. The formatter 35 provides for the formatting of the page addresses that are used by the page message generator pursuant to a PCH page.

When a communication service is to be performed with the UE 12, its unique identifier, here a TMSI, a 32-bit value that uniquely identifies the UE, is provided to the hasher 26. The hasher 26 operates to hash the values of the TMSI, or other unique identifier, into groups of hashed values. The groups of hashed values are provided to the page message generator 36. The page message generator 36 forms a first message for transmission upon the DL-CCH 18 and, thereafter, a second message that is sent upon the PCH 22. The hashing is performed in a manner such that, collectively, all of the bits of the TMSI, or other unique identifier, are used in the first and second page messages.

The UE 12 includes further apparatus, shown at 38 of an embodiment of the present disclosure. The apparatus 38 is also functionally represented, formed of entities implementable in any desired manner, including by algorithms executable by processing circuitry. The apparatus includes a first detector 42, a second detector 44, a combiner 48, and a determiner 52. The UE is further shown to include transceiver circuitry, here represented by a receive (RX) part 56 and a transmit (TX) part 58.

The first detector 42 operates to detect a page message sent on the first paging channel 18, here the DL-CCH. When a page message is sent and delivered to the mobile station, the first detector 42 detects its contents, provides values of the detected contents to the combiner 48, and provides an indication to the second detector 44 to monitor for the communication of a page message on the paging channel 22. When a paging message is subsequently sent on the paging channel and delivered to the mobile station, the second detector 44 detects its delivery and provides values of the page message to the combiner 48. In one implementation, the detected values are provided to the determiner 52, and determination is made by the determiner as to whether the UE has been paged. Alternately, and in the illustrated implementation, the bits that are detected by the detector are first provided to the combiner 48.

In the implementation in which the combiner is utilized, the combiner 48 operates to combine the values provided thereto by the detectors 42 and 44. The combiner combines the detected bits. And, the combined values are provided to the determiner 52 at which determination is made as to whether the UE has been paged. If the created, unique identifier corresponds with the unique identifier of the mobile station, as determined by the determiner 52, a determination is made that the mobile station is being paged. Lines 62 and 64 extending to the receive and transmit parts, respectively, of the mobile station, alert the transceiver circuitry to enter into a state pursuant to performance of the communication service.

Figure 2:
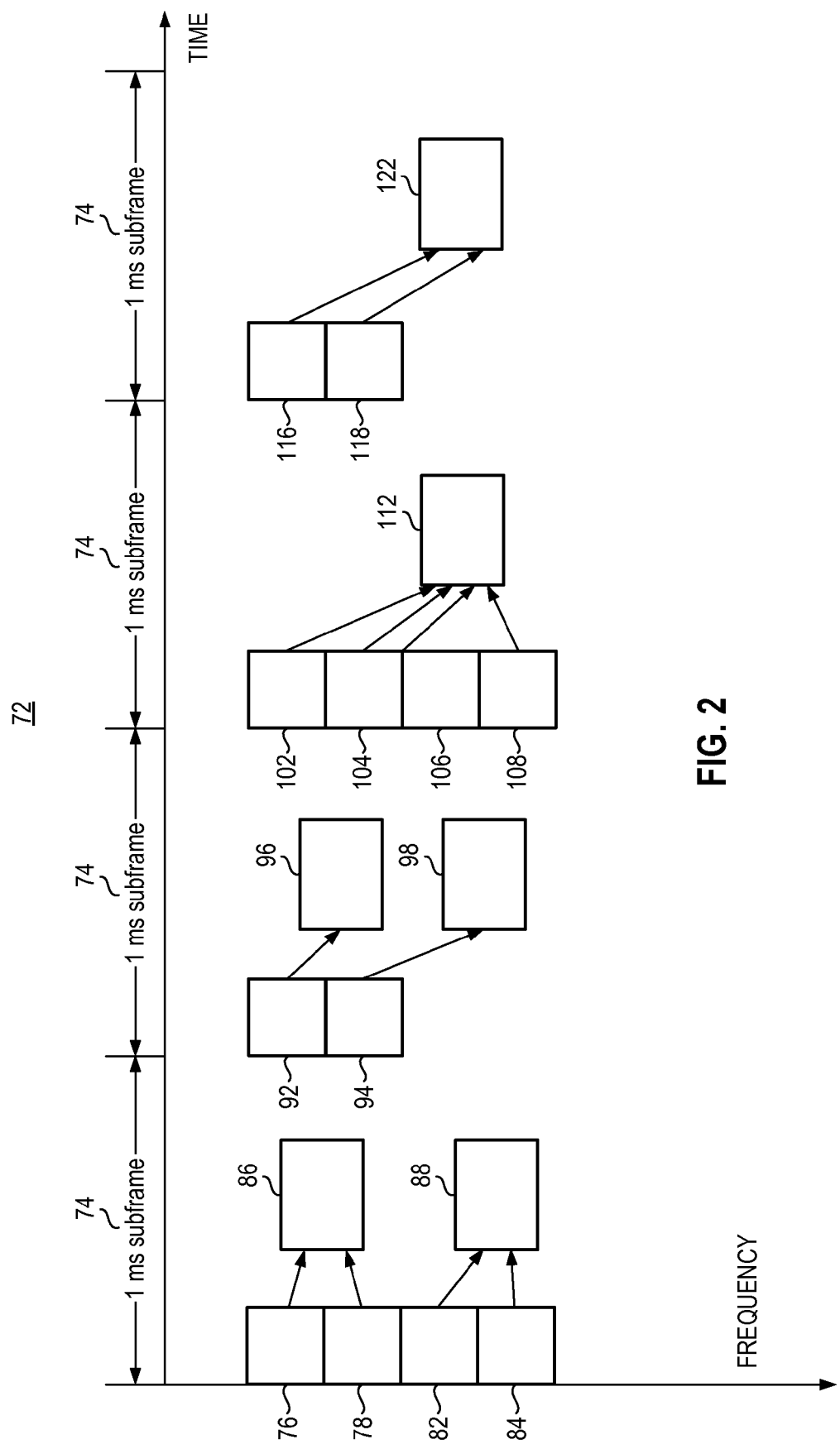
FIG. 2 illustrates a representation of an exemplary allocation of first and second paging channels during four successive sub frame time periods.

FIG. 2 illustrates a representation, shown generally at 72, of exemplary paging in a 3GPP LTE radio air interface. Here, the first four 1-ms sub frames 74 of a 10 ms frame are shown. Each sub frame 74 includes multiple DL-CCH channels, and messages sent thereon, followed by one or more pages generated on one or more paging channels.

In the first sub frame, four DL-CCHs 76, 78, 82 and 84 are shown. Each of the DL-CCHs is defined upon different OFDM sub carrier frequencies. The channels 76 and 78 here send assignment information that direct UEs to receiver their pages in a first PCH page message 86. The channels 82 and 84 here send assignment information directing UEs to receive their pages sent on a second PCH 88. Messages sent on the channels 86 and 88 are transmitted using different OFDM sub carrier frequencies.

The second sub frame 74 illustrates DL-CCHs 92 and 94. Messages generated on each of these two channels are transmitted using different OFDM sub carrier frequencies. The channel 92 has assignment information that directs a UE to receive its page on the PCH 96. The channel 94 has assignment information that directs a UE to receive its page on the PCH 98. The page messages 96 and 98 are transmitted using different OFDM sub carrier frequencies. A page message sent on the channel 96 is sent on a different set of OFDM sub carrier frequencies than those used by the channel 92. Likewise, the page message sent on the channel 98 is sent on a different set of OFDM sub carrier frequencies than the frequencies used by the channel 94.

The third sub frame 74 shows four DL-CCHs, 102, 104, 106, and 108. Each of the four channels is defined upon different OFDM sub carrier frequencies. Messages sent thereon all have assignment information directing UEs to receive their pages on a paging channel 112. The page message sent on the paging channel 112 is sent on a different set of sub carrier frequencies than those upon which any of the channels 102-108 are defined.

In the fourth sub frame 74, two DL-CCHs 116 and 118 are defined. Messages broadcast thereon both have assignment information directing UEs to receive their pages on a paging channel 122. The page message sent on the paging channel 122 is sent on a different set of sub carrier frequencies than those that define either of the channels 116 or 118.

Figure 3:
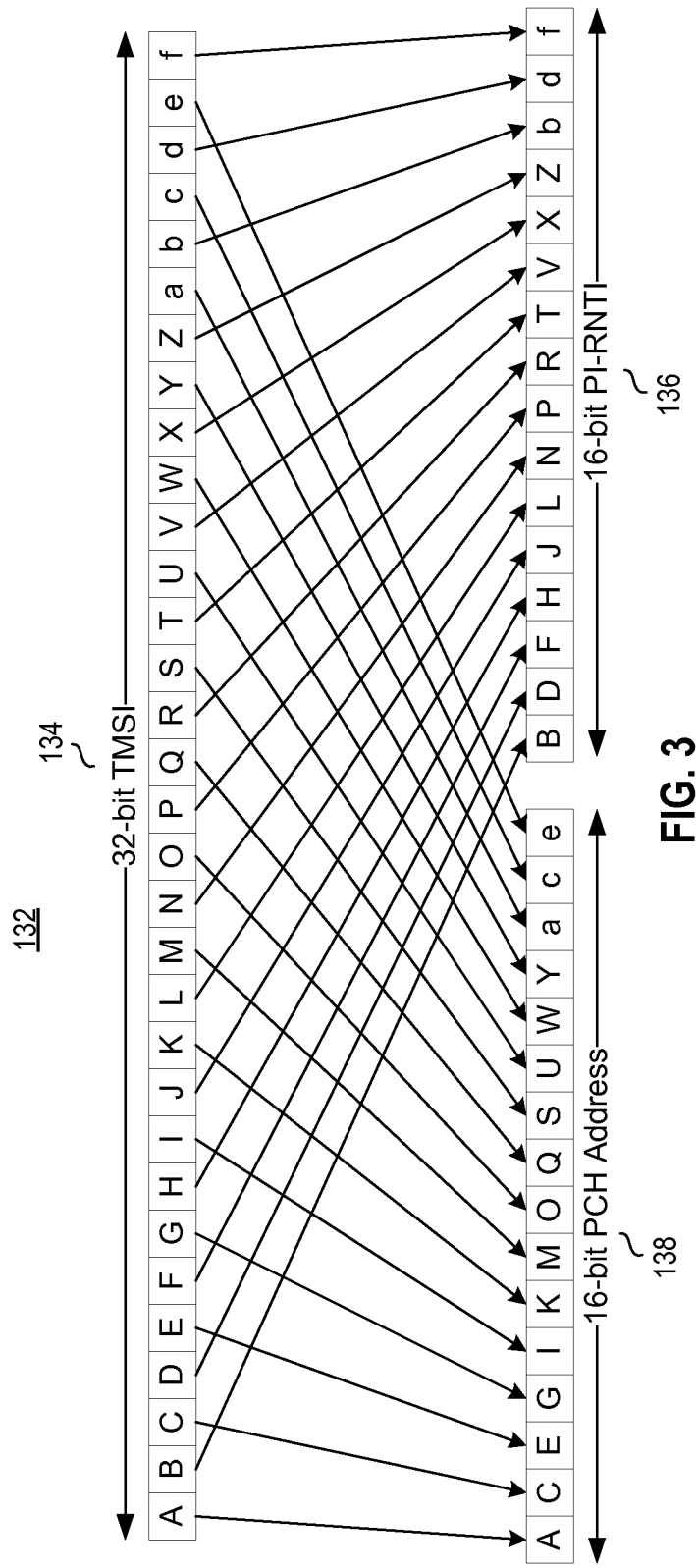
FIG. 3 illustrates exemplary hashing performed during operation of an embodiment of the present disclosure.

FIG. 3 illustrates a representation 132 representative of exemplary hashing performed pursuant to an embodiment of the present disclosure. Here, a 32-bit TMSI address 134 is hashed into two groups of hashed bits 136 and 138. The first group 136 defines a 16-bit PI-RNTI value, and the second group 138 defines a 16-bit PCH address. The PCH address is a short address that is used in a PCH page message. Hashing is performed to page the UE that is associated with the unique identifier 134. In the scheme represented in FIG. 3, all of the bits of the TMSI are divided between the groups 136 and 138 such that all of the TMSI bits are used for paging. The PI-RNTI 136 is formed of 16 of the TMSI bits. And, an address to be used on the PCH is formed of the other 16 of the TMSI bits.

TMSI assignment is performed by a core network, and the radio access network portion of the network does not have control over the TMSI assignment procedure. If the core network assigned TMSIs that were random in all 32 bits, then the mapping of the 32 TMSI bits to the groups 136 and 138 would not require hashing. If, for example, the PI-RNTI could be set to the most significant bits of the TMSI, and the 16 bit short page address were set to the least significant bits of the TMSI, the randomness would carry over to the groups of bits. However, the bits of the TMSI may not be randomly assigned. According to a simple TMSI assignment procedure, the core network could simply assign TMSIs sequentially. In this scenario, if there were a small number of UEs then all UEs would have the same PI-RNTI values, thus forcing all UEs monitoring a sub frame to monitor all PCH page messages. Battery life of the UE would be reduced.

Hashing in accordance to the representation 132 avoids this problem by assigning the PI-RNTI such that it is not simply a contiguous portion of the TMSI, and likewise assigning the short page address such that it is not simply a contiguous portion of the TMSI. The PI-RNTI is set, as shown, to the concatenation of multiple non-contiguous portions of the TMSI. Likewise, the short page address 138 is set to the concatenation of multiple non-contiguous portions of the TMSI. In this scheme, the multiple non-contiguous portions of the TMSI used to form the PI-RNTI and the short page address are all 1-bit, non-contiguous portions. Alternately, some or all of the non-contiguous portions could be multi-bit, non-contiguous portions. As illustrated, the TMSI is formed of 32 bits A-f. A is the most significant bit and f is the least significant bit. The PI-RNTI 136 is formed by concatenating the even bits B . . . f of the TMSI together. The short page address 138 is formed by concatenating the odd bits A . . . e of the TMSI together. Many variations of the scheme shown in the representation 132 are, of course, possible.

One of the benefits provided by the scheme of the representation 132 is that all bits of the unique identifier are together used on the DL-CCH and the PCH. Some of the address bits are used on the DL-CCH and remaining ones of the address bits are used on the PCH. By using all of the bits to page the UE rather than a subset of the bits, any issues associated with having two UEs responding to the same page are avoided.

It should be noted that, while the exemplary representation utilizes a TMSI, in other implementations, other identifiers are used, e.g., an IMSI (International Mobile Subscriber Identifier) address or a hardware identifier. In one implementation, the infrastructure and the UE could use a first type of address, such as an IMEI (International Mobile Equipment Identifier) on both the DL-CCH and the PCH if there is no TMSI assigned to the UE. The network and the UE would then use a second type of address, such as a TMSI on both the DL-CCH and the PCH if a TMSI is assigned to the UE.

Figure 4:
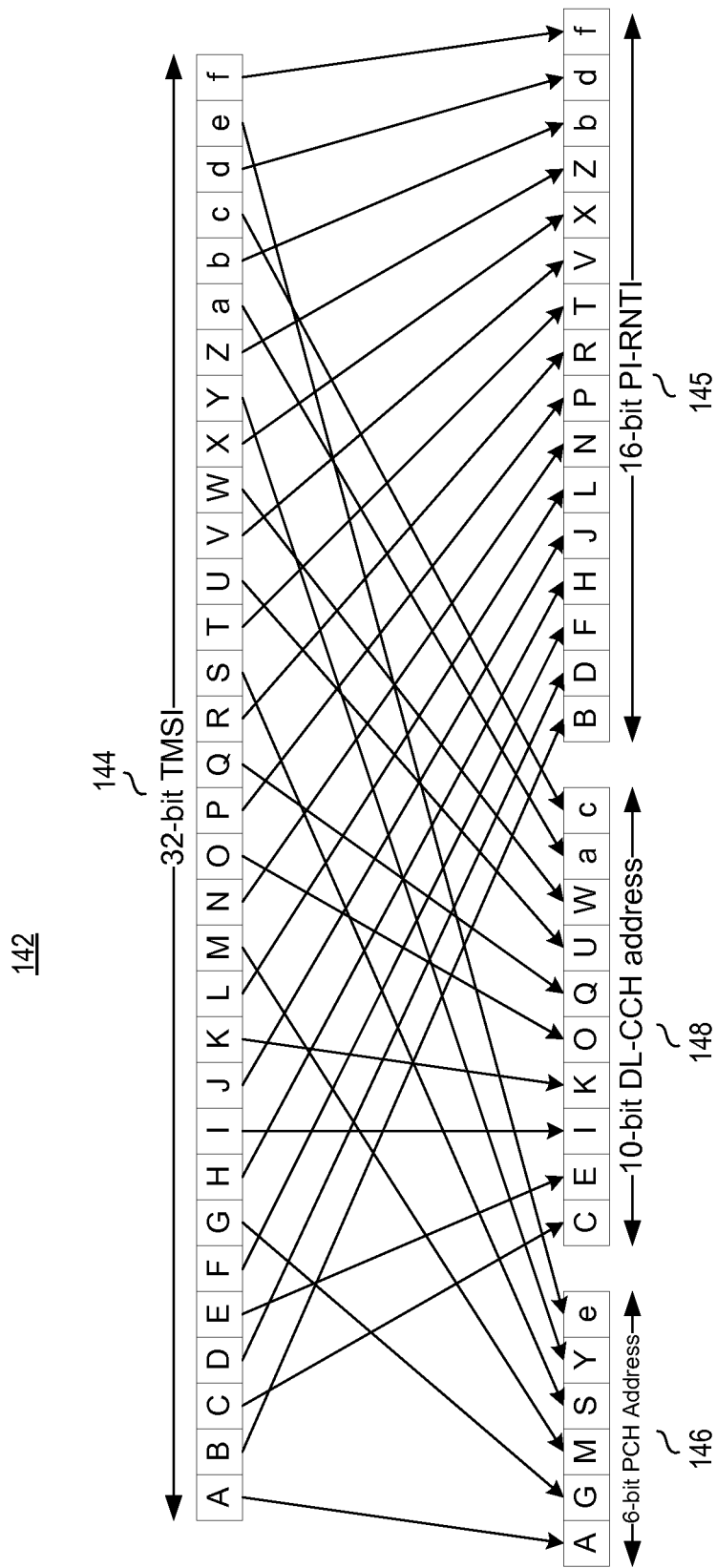
FIG. 4 illustrates a representation, similar to that shown in FIG. 3, but here showing alternate hashing performed pursuant to operation of an alternate embodiment of the present disclosure.

FIG. 4 illustrates a representation 142 of another hashing scheme utilized pursuant to an embodiment of the present disclosure. Here, the 32-bit TMSI, or other unique identifier, 144 of a UE is hashed into three groups, a first hashed group 145, a second hashed group 146, and a third hashed group 148. The first group 145 again forms a 16-bit PI-RNTI. The second group 146 forms a 6-bit short address to be used in a PCH page message. And, the third group 148 forms a 10-bit DL-CCH address. In 3GPP, the final format for the DL-CCH is not yet formulated. However, it appears that, when used for paging, there may be as many as 11 bits from the DL-CCH payload that would be unused. It is contemplated that currently unused bits are able to be allocated to carry additional address bits in order to further reduce the size of the address used on the PCH and, thus, further save capacity on the PDSCH. When a UE receives the DL-CCH and the CRC check passes, then the UE determines that the message is being sent, addressed to the PI-RNTI of the UE. The UE then compares the received DL-CCH address to its own DL-CCH address. If the two match, then the UE attempts to receive a PCH page message based upon the received assignment information. It should be noted that, adding more address bits in addition to the PI-RNTI to the DL-CCH, reduces the probability that a UE shall receive the PCH page message in response to another UE being paged. Considerably more energy is required to receive a PCH message, thus this implementation provides battery savings. The hashing mechanism set forth in FIG. 4 is performed by the network part in order to page a UE. The hashing mechanism set forth in FIG. 4 divides all of the bits of the TMSI between the DL-CCH and the PCH page message such that all of the TMSI bits are conveyed when paging a UE. And, in other implementations, the PI-RNTI is formed of fewer than sixteen of the TMSI bits; for example, six bits of the PI-RNTI could be constant and the other ten bits could be formed from the TMSI. The DL-CCH address is formed another 10 bits of the TMSI. And an address to be used on the PCH is formed of the other 6 bits of the TMSI bits.

Although the scheme set forth in FIG. 4 shows that the short PCH address is six bits and that the DL-CCH address is ten bits, it should be noted that other bit lengths could be used for the DL-CCH address and for the short PCH page address. In the event that there are fewer unused bits available for paging on the DL-CCH than currently anticipated, then the DL-CCH address can be shortened and the short PCH address can correspondingly be lengthened. Alternatives include, e.g., a 7-bit, short PCH address with a 9-bit DL-CCH address, an 8-bit short PCH address with an 8-bit DL-CCH address, a 9-bit short PCH address with a 7-bit DL-CCH address, an 10-bit short PCH address, with a 6-bit DL-CCH address, etc. Various combinations are used with the entire TMSI used for paging the UE on the DL-CCH and the PCH.

In the scheme set forth in FIG. 4, the PI-RNTI is assigned such that it is not simply a contiguous portion of the TMSI. And the DL-CCH address is also assigned in a manner such that it is not simply a contiguous portion of the TMSI. And, also, the short page address is assigned such that it also is not a simply contiguous portion of the TMSI. Each of the groups of bits is set to the concatenation of multiple, non-contiguous portions of the TMSI. In the scheme shown in FIG. 4, all of the hashing is of 1-bit, non-contiguous portions. In alternate schemes, some, or all, of the non-contiguous portions are instead multi-bit, non-contiguous portions. Here, the PI-RNTI is formed by concatenating the even bits of the TMSI together. The DL-CCH address is formed by concatenating a first group of odd bits and the short page address is formed by concatenating a second group of odd bits together. Many variations of the scheme shown by the representation 142 are possible.

A benefit associated with the hashing scheme of the representation 142 is that all bits of the address 144 are used. Some of the address bits are used on the DL-CCH, and the remaining address bits are sent on the PCH. By using all of the bits to page the UE instead of a subset of the bits, any issues associated with having two UEs respond to the same page are avoided.

Here, again, while a TMSI address forms the identifier 144 in the exemplary implementation, in other implementations, other unique identifiers, such as an IMSI or a hardware identifier are instead used. Again, in one implementation, the infrastructure and the UE could use a first type of address such as an IMEI on both the DL-CCH and the PCH if there is no TMSI assigned to the UE; the network and the UE would then use a second type of address such as a TMSI on both the DL-CCH ad the PCH if a TMSI is assigned to the UE.

Figure 5:
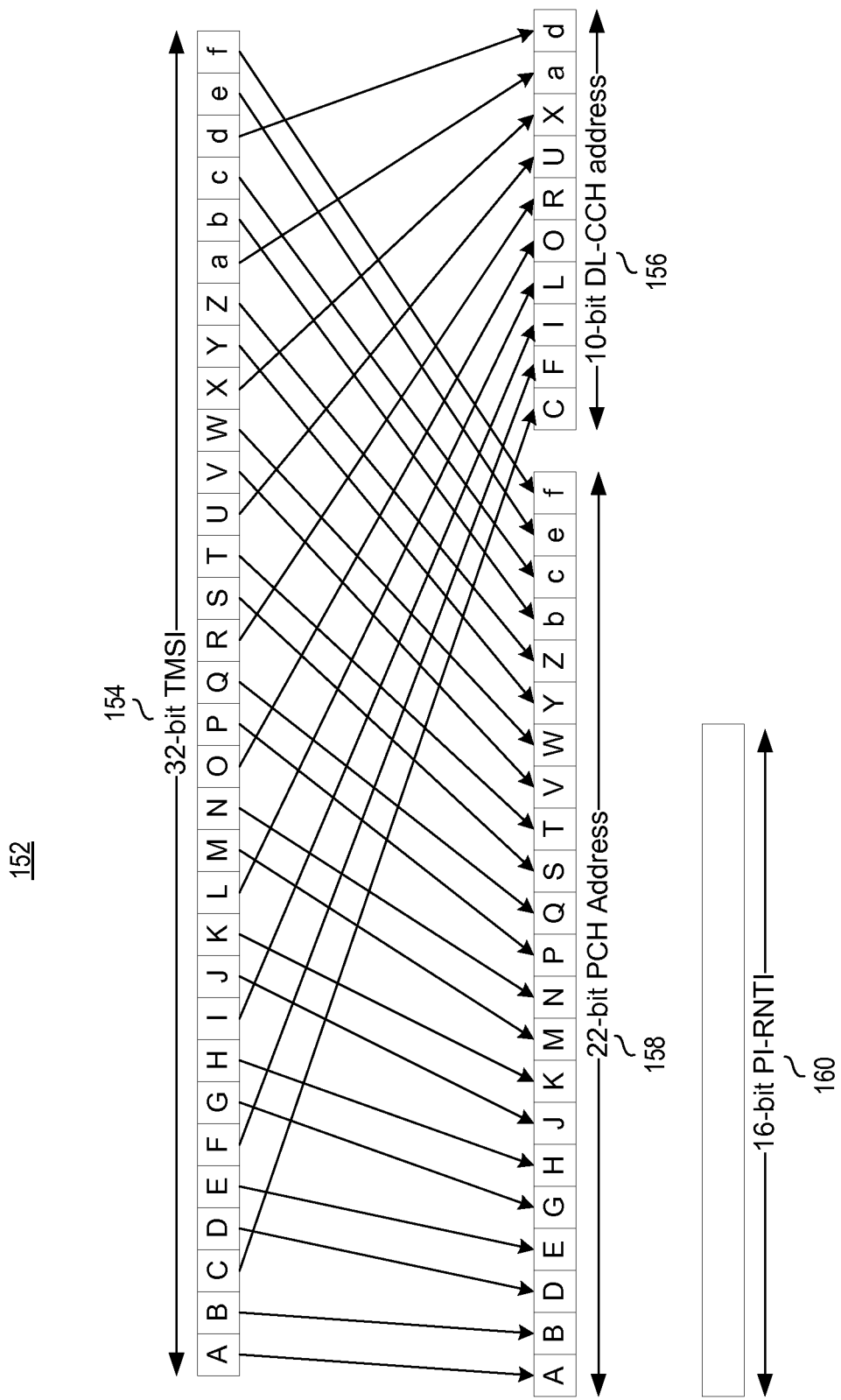
FIG. 5 illustrates another representation, similar to those shown in FIGS. 3-4, but representative of alternate hashing performed pursuant to another alternate embodiment of the present disclosure.

FIG. 5 illustrates a representation 152 of another hashing scheme used pursuant to operation of another embodiment of the present disclosure. Here, again 32-bit TMSI 154 is hashed into a first group of hashed bits 156 and a second group of hashed bits 158. In this scenario, it is assumed that a single PI-RNTI value 160 is used for individually directed pages to all UEs. That is to say, the same PI-RNTI 160 is used to page all UEs. The PI-RNTI 160 is set to a value, such as, e.g., 0xffff or any other value. As the PI-RNTI is set to a fixed value for all individually directed pages, the PI-RNTI is not used to convey address bits of the unique identifier of a UE. The scheme set forth in FIG. 5 shows an example of a manner by which to hash a 32-bit TMSI address 154 to a 22-bit short address 158 to be used in the PCH page message, and a 10-bit, DL-CCH address 156. When a UE receives the DL-CCH-sent message, and the CRC check passes with the PI-RNTI 160, the UE determines that the DL-CCH message is part of an individually-directed page. The UE then compares the received DL-CCH address to its own DL-CCH address. If the two match, then the UE attempts to receive a PCH page message based upon the received assignment information. The hashing mechanism represented in FIG. 5 is performed at the network and a corresponding hashing procedure is performed at the UE. Again, all of the bits of the TMSI 154 are included, collectively, in the group 156 and group 158. Again, while, in the exemplary implementation, the first group 156 is of a 10-bit length and the second group 158 is of 22-bit length, in other implementations, the addresses 156 and 158 are formed of other lengths, analogous to the scenario set forth above with respect to FIGS. 3 and 4. Additionally, again, the hashing is performed in a manner such that multiple, non-contiguous portions of the TMSI are hashed and concatenated together. In other implementations, multiple, non-contiguous portions of the TMSI are used to form the first and second groups 156 and 158. And, again, in other implementations, other values, other than the TMSI, such an IMSI or other hardware identifier, is instead utilized and hashed. Again, in one implementation, the infrastructure and the UE could use a first type of address, such as an IMEI, on both the DL-CCH and the PCH if there is no TMSI assigned to the UE; the infrastructure and the UE would then use a second type of address such as a TMSI on both the DL-CCH and the PCH if a TMSI is assigned to the UE.

Figure 6:
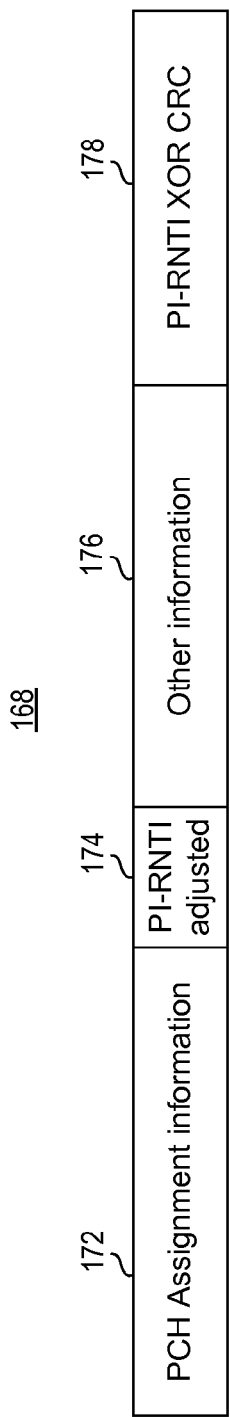
FIG. 6 illustrates an exemplary message format of an exemplary message generated pursuant to operation of the radio communication system shown in FIG. 1 of an embodiment of the present disclosure.

FIG. 6 illustrates an exemplary DL-CCH message, shown at 168, used for an individually directed page. The message includes a PCH assignment information field 172, a PI-RNTI adjusted field 174, an other information field 176, and an error detecting code field 178.

The PCH assignment information field 172 includes information to direct a UE how to receive a PCH message. For example, with respect to the example shown in FIG. 2, the information in the PCH assignment information field 172 of the channel 76 informs the UE of the PCH page 86. The information in the PCH assignment information field 172 would indicate which OFDM sub carrier frequencies are used for the PCH page. Additional information includes, e.g., items such as a time off set until the beginning of the PCH page or a timed duration of the PCH page. The field 174 indicates to the UE whether the PI-RNTI of the UE is adjusted in order to avoid a collision with a reserve PI-RNTI. The field 174 is may be used to ensure that the UE is uniquely addressed. Alternately, the PI-RNTI adjusted field 174 is omitted if it is not imperative that the UE be addressed uniquely. The field 176 includes other information and may consist, of reserved bits. The error detecting code field 178 is set to the PI-RNTI exclusive-ORed with a CRC computed over the fields of the message.

Figure 7:
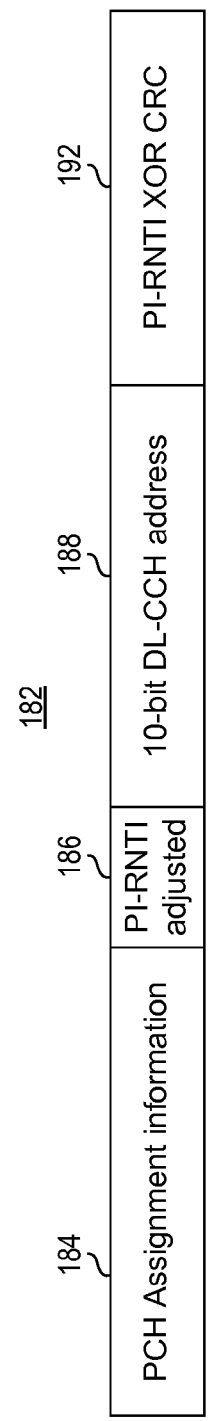
FIG. 7 illustrates a representation, similar to that shown in FIG. 6, but of an alternate message generated pursuant to an alternate embodiment of the present disclosure.

FIG. 7 illustrates another exemplary DL-CCH message, shown at 182, used for an individually-directed page. The message includes a PCH assignment information field 184, a PI-RNTI adjusted field 186, a 10-bit DL-CCH address field 188, and an error detecting code field 192. The fields 184, 186, and 192 are analogous to those set forth above with respect to the message 168 shown in FIG. 6.

The field 188 is used to carry more bits of the UE address and corresponds to the address 146 shown in FIG. 4. Different types of hashing, other than those set forth in FIG. 4 can be used to form the bits of the field. And, lengths other than 10 bits can also be used.

Figure 8:
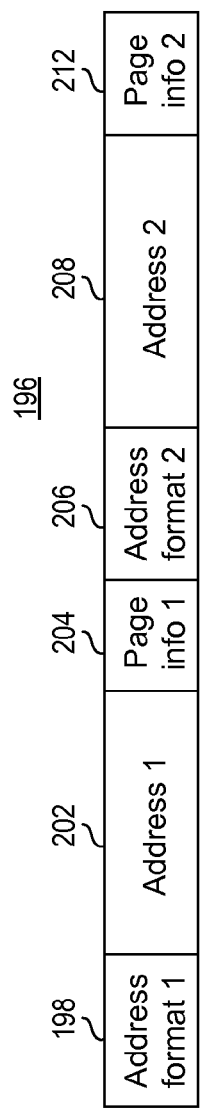
FIG. 8 illustrates a representation of another exemplary message generated pursuant to operation of an embodiment of the present disclosure.

FIG. 8 illustrates portion 196 of an exemplary PCH message that is used to page two UEs. Fields present in an actual page message, such as header bits, a message ID, and an error detecting code are not shown. The PCH page message is used to page at least one UE and can be used to page two or more UEs by including multiple page records in the message. The example shown in FIG. 8 shows two page records. The first page record comprises an address format field 198, an address field 202, and a page info field 204. The second page record comprises an address format field 206, and address field 208, and a page info field 212.

The address format field 198 includes information about the address field 202. The address format field 198 is indicative of the length of the address field 202. The address format field 198 may also specify the type of address if multiple types of address are used for paging. Possible address types include a TMSI, an IMSI, and a hardware identifier. Alternately, the type of address could be specified by another field if multiple address types were supported at the same time. The address format field 198 is, for example, a single-bit field if there is only one type of address possible and only two possible lengths. Alternately, the address format field 198 is a multi-bit field. The address field 202 includes either the UE identity or a hashed portion of the UE identity.

The page info field 204 includes information about the page. This information is, for example, the service that is causing the UE to be paged. Knowing the service that caused the page can help the UE to request set up of the appropriate resources when the UE responds to the page. The page info field 204 may also include other information. The fields 206-212 are analogous to the fields 198-204.

Turning next to FIG. 9, exemplary address formats and their corresponding address bits that would be included in a page record as just-defined, are shown. FIG. 9 illustrates four exemplary formats having fields, here 2-bit fields 206, 208, 210, and 212 that are of values identifying address formats, analogous to the address formats forming parts of the page records shown in FIG. 8. Each example includes an address field, identified at 214, 216, 218, and 222, respectively, of the different examples shown in FIG. 9. The address fields are exemplary of the addresses 202 and 208 that form parts of the message 196 shown in FIG. 8. The address formats 206 and 208 and address fields 214 and 216 are, e.g., associated with the hashing scheme set forth in FIG. 3 but address field 216 as shown is not used with the hashing scheme set forth in FIG. 4. The address field 214 is the same as the address fields 134 and 144 shown in FIGS. 3 and 4, respectively. That is to say, the address 214 comprises a TMSI address, an IMSI address, or other value. The address field 216 is the same as the address field 138 shown in FIG. 3 and represents, here, a 16-bit hash of the address 214 or 134 of the earlier figure.

Alternately, if a DL-CCH address is used on the DL-CCH, the address field 216 is, e.g., simply a concatenation of a 6-bit PCH address 146 shown in FIG. 4 and a 10-bit DL-CCH address 148 shown in FIG. 4. In this alternative implementation, the address field 216 comprises the same bits but in a different order.

The address field 222 is the same as the address field 146 shown in FIG. 4 and represents a 6-bit hash of the TMSI, or other, address 144 shown in FIG. 4. And, the address field 218 is equal to the concatenation of address field 146 shown in FIG. 4 and the 10-bit DL-CCH address 148 shown in FIG. 4. The network chooses the address format, here amongst the fore-shown examples based upon how many address bits are to be included in the page record of the message.

FIG. 10 illustrates additional exemplary address formats and corresponding address bits of an alternate implementation, here in which the hashing scheme 152 shown in FIG. 5 is utilized. The fields 224 and 226 represent address formats, such as the address formats 198 and 206 of the message 196 shown in FIG. 8. The address fields 228 and 230 represent address bits that are included in a page record of the page message 196 when the address formats 224 and 226 are used, respectively. The address fields 228 and 230 are used, for example, in page record fields such as the fields 202 and 208 shown in FIG. 8. The address field 230 is the same as the address field 158 shown in FIG. 5 and represents, here, a 22-bit hash of the TMSI address that forms the address field 154. The network chooses the address format based upon how many address bits are to be included in the page record.

Figure 11:
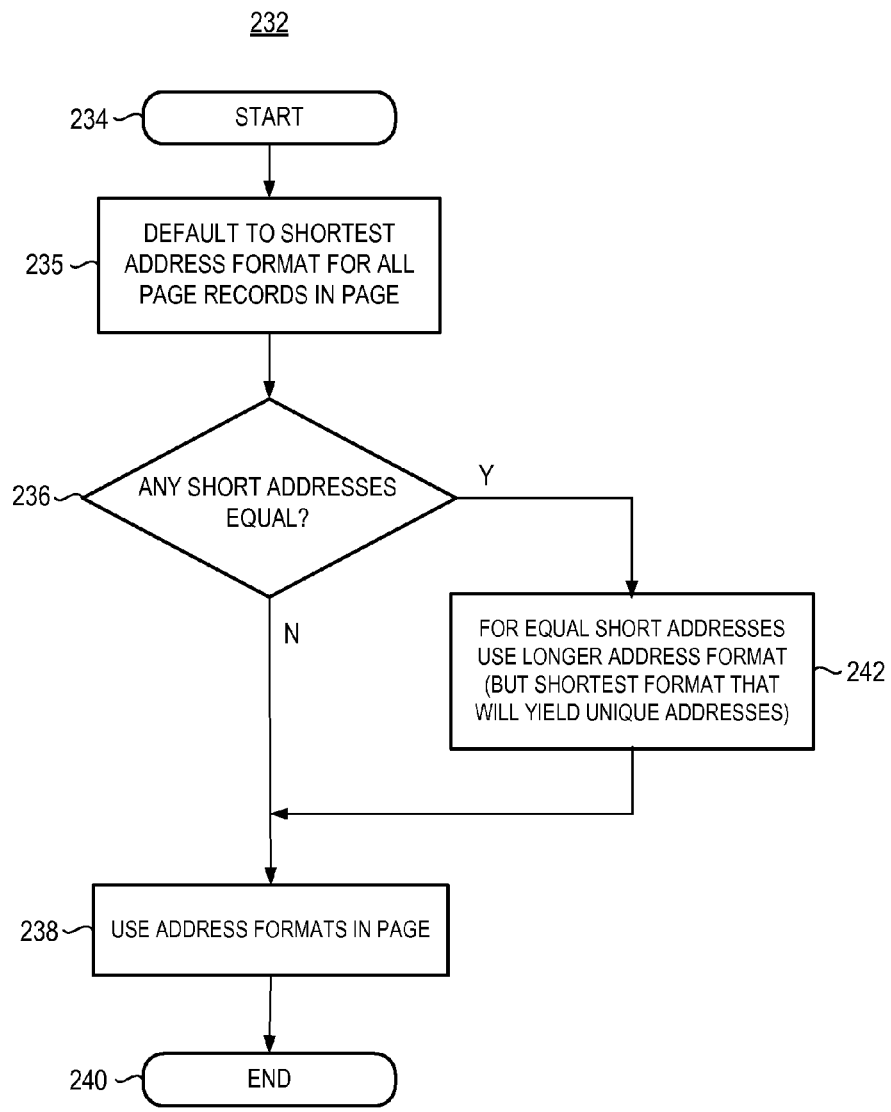
FIG. 11 illustrates a process diagram representative of the process of operation of an embodiment of the present disclosure.

FIG. 11 illustrates a process 232 representative of the process of operation of an embodiment of the present disclosure. The process is used to choose address formats in a PCH page in order to ensure that a UE that receives a PCH page is able to determine which page record is intended for that particular UE. The process is performed when determining the content that is to be included in a PCH message. The processing commences subsequent to entry indicated by the start block 234. As indicated by the block 235, the network defaults all short address formats to the shortest address format. For instance, if the address hashing set forth in the scheme 132 shown in FIG. 3 is used, then for all page records in a page message address format 208 would specify that the address bits 216 (shown in FIG. 9) are used. As another example, if address hashing pursuant to the scheme 142 shown in FIG. 4 is used, then for all page records in a page message, address format 212 specify that the address bits 222 are used.

Subsequent to the operations at the function block 235 are performed, a decision is made, indicated by the decision block 236 as to whether any of the short addresses are of equal values. If not, the no branch is taken to the block 238, and the address formats are used in the page. Otherwise, in the event that two or more of the short addresses are of equal values, the yes branch is taken from the decision block 236 to the block 242. At the block 242, for any of the short addresses that are equal, the network chooses a longer address format, but chooses the shortest format that unambiguously indicates to the UEs the correct page records. A branch is then taken to the block 238, and the network uses the address formats in the page. Processing ends, as indicated by the end block 240.

In a first example, two UEs use the hashing scheme 142 set forth in FIG. 4. The first UE has a TMSI of 0x00000000 and the second UE has a TMSI of 0x7df7df7d. The network defaults the PCH short address of the first UE to 0x00, i.e., the address format field 212 shown in FIG. 9 is set equal to binary '11' and the address field 222 is set equal to 0x00, and the DL-CCH is set to 0x000 and the PI-RNTI is set to 0x0000. The network also defaults the PCH short address of the second UE to 0x00 but sets the DL-CCH to 0x3ff and the PI-RNTI RNTI to 0xffff. At the decision block 236 shown in FIG. 11, the network determines that the two short addresses are equal and then takes the yes branch to the block 242. At the operation 242, the network chooses the next smallest address format that yields a unique PCH short address for both of the UEs. If the network chooses an address format field 210 shown in FIG. 9, i.e., binary '10' for the short addresses, the short address 218 of the first UE would be 0x000, and the short address 218 of the second UE would be 0x00f. This example yields unique short addresses and is the next smallest address format, and the network chooses the address format bits 210 and the address bits 218.

By way of a second example, two UEs use the hashing method used in FIG. 4. The first UE has a TMSI of 0x00000000 and the second UE has a TMSI of 0x5557DF7D. The network defaults the PCH short address of the first UE to 0x00. That is, the address format field 212, shown in FIG. 9, is set equal to binary '11', and the address field 222 is set equal to 0x00. The DL-CCH is set to 0x000, and the PI-RNTI is set to 0x0000. The network also defaults the PCH short address of the second UE to 0x00. But, the DL-CCH is set to 0x03f, and the PI-RNTI is set to 0xffff. At the decision block 236, the infrastructure determines that the two short addresses are equal, and then takes the yes branch to the block 242. At the function 242, the network chooses the next smallest address format that yields a unique PCH short address for both of the UEs. If the network were to choose address format field 210 binary '10' for the short addresses, the short address 218 of the first UE would be 0x000, and the short address 218 of the second UE would also be 0x000. Using the address format 210 and the address bits 218 would still result in equal short addresses. Therefore, a larger short address is required. If the network were to choose the address format field 208, binary '01', for the short addresses, the short address of the first UE 216 would be 0x0000, and the short address 216 of the second UE would be 0x01B6. This yields unique short addresses, and is the next-smallest address format. Therefore, the network chooses the address format bits 208 and the address bits 216.

As a third example, two UEs use the hashing scheme set forth in FIG. 4. The first UE has a TMSI of 0x0000000. And, the second UE has a TMSI of 0x55555555. The network defaults the PCH short address of the first UE to 0x00, i.e., the address format field 212 is set to binary '11'. And, the address field 222 is set equal to 0x00. And, the DL-CCH is set to 0x000, and the PI-RNTI is set to 0x0000. The network also defaults the PCH short address of the second UE to 0x00. And, the network sets the DL-CCH to 0x000. But, the PI-RNTI is set to 0xffff. At the decision block 236 shown in FIG. 11, the network determines that the two short addresses are equal and then takes the yes branch to the block 242. At the function 242, the network chooses the next-smallest address format that yields unique PCH short addresses for both of the UEs. If the network infrastructure were to choose the address format field 210, binary '10', for the short addresses, the short address 218 would be 0x000, and the short address 218 of the second UE would also be 0x000. Using the address format 210 and the address bits 218, equal short addresses result. Therefore, a larger short address must be selected. If the network were to choose the address format field 208, binary '01' for the short addresses, the short address 216 of the first UE would be 0x0000, and the short address 216 of the second UE would also be 0x0000. Using address format 208 and the associated address bits 216 would therefore result in equal short addresses. And, therefore, a larger address format is required to be chosen. The only remaining address format choice is 206 and the corresponding address bits 214 that represent the full TMSIs. The network uses the full addresses in the PCH page message for both the first and second UEs. The network chooses the address format bits 206 and the address bits 214.

Figure 12:
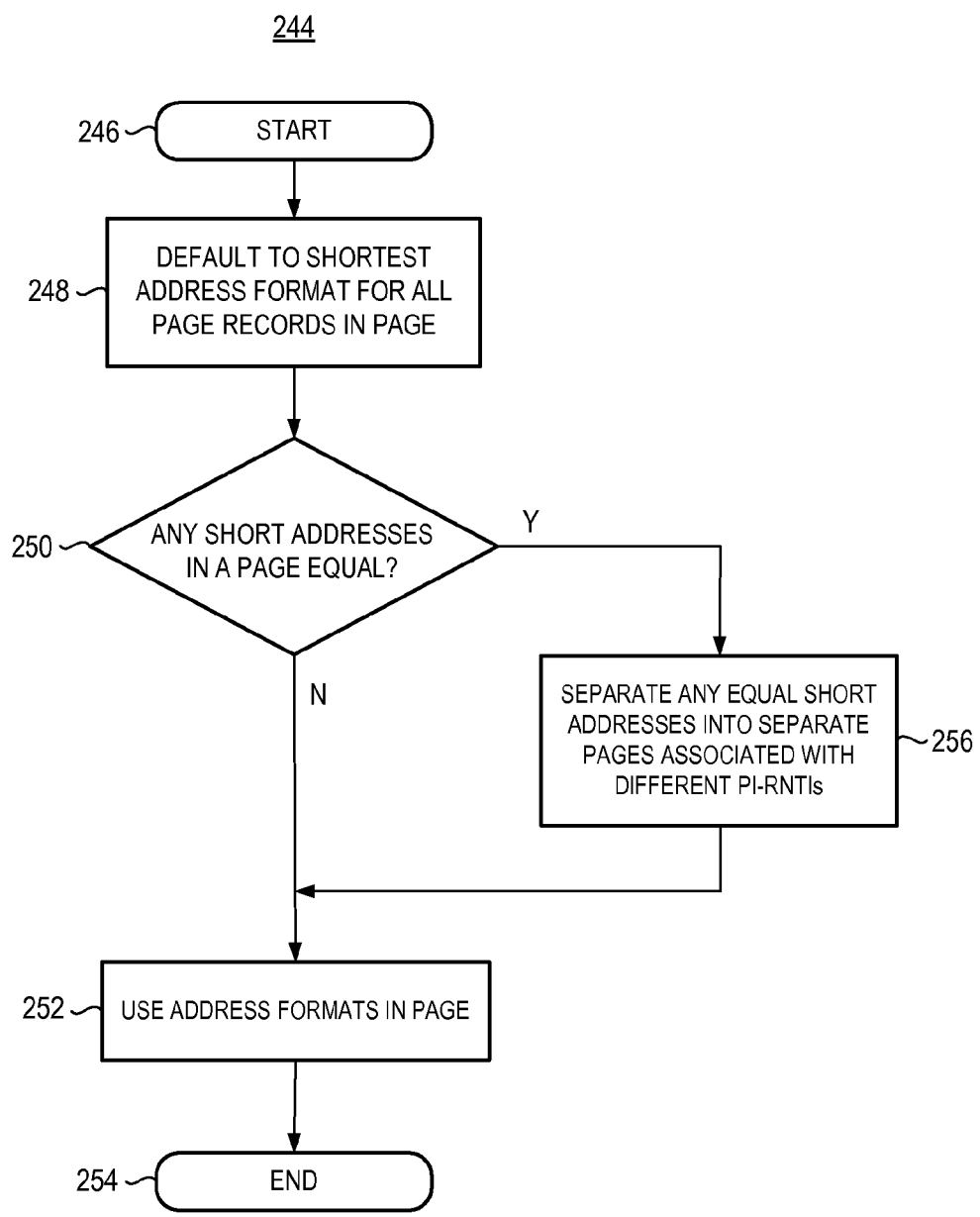
FIG. 12 illustrates a process diagram, also representative of the process of operation of an embodiment of the present disclosure.

FIG. 12 illustrates a process, shown at 244, representative of the process of an embodiment of the present disclosure to choose which UEs to page in a single PCH page message in order to ensure that a UE receiving a PCH page is able to determine which page record is intended for the UE. The network performs this process when determining the PCH content. Processing commences subsequent to entry indicated by the start block 246. First, and as indicated at the block 248, the network defaults all short address formats to the shortest address format. For example, if address hashing corresponds to that shown in FIG. 3 were used, then for all page records in the page message address format 208 would specify that address bits 216 would be used. As another example, if address hashing corresponding to the scheme shown in FIG. 4 were used, for all page records in the page message, the address format 212 would specify that the address bits 222 would be used. Then, a determination is made, as indicated by the decision block 250. The network determines if any of the short address fields in the page are equal to each other. If not, the no branch is taken to the block 252, and the network uses the address formats in the page. And, processing then terminates at the end block 254. If, conversely, the short addresses are equal, the yes branch is taken to the block 256. At the function 256, the network removes the page records that are associated with duplicate short addresses from the current page message until all of the short addresses in the PCH page message are different. The removed page records are placed in another page message in the frame, and different DL-CCHs are used to direct the affected UEs to the new page message.

For instance, and with respect to the exemplary scheme shown in FIG. 2, four UEs are paged. The network uses the first sub frame to page the UEs. And, in this example, the short address format 212 associated with the address bits 222 are to be used in the PCH page messages 86 and 88. Also, in this example, the short addresses for the four UEs are 0x00, 0x00, 0x05, and 0x07, respectively. Also, in this example, the default arrangement of the page records in the page messages 86 and 88 result in the first two UEs being paged with the page message 86, and the third and fourth UEs being paged with a page message 88. The DL-CCHs for the four UEs are 76, 78, 82, and 84, respectively. At the decision block 250, the network determines that are two equal short addresses, 0x00 for the first UE and 0x00 for the second UE in the PCH page message 86. The network then takes the yes branch to the block 256 and separates the two pages into different page messages. In order to do this, the network removes either the page for the first UE or the page for the second UE and moves it to the PCH page 88. Neither of the short addresses for the third or fourth UEs are equal to 0x00. The infrastructure chooses either of these and places the chosen one in the page message 86. As an example, the network swaps the pages for the second and fourth UEs. The network then pages the first and fourth UEs in the PCH page message 86, and the network pages the second and third UEs in the page message 88. The DL-CCHs for the four UEs are designated at 76, 78, 82, and 84. In a second example, again according to the representation set forth in FIG. 2, the network pages 6 UEs. The network uses the first and second sub frames to page the UEs. In this example, the short address format 212 corresponding to the address bits 222 are to be used in the PCH page messages 86, 88, 96, and 98. Also, in this example, the short addresses for the six UEs are 0x00, 0x00, 0x00, 0x05, 0x06, and 0x07. Also, in this example, the default arrangement of the page records in the page messages 86, 88, 96, and 98 result in the first two UEs being paged with the page message 86, the second two UEs being paged with the page message 88, the fifth UE being paged with the page message 96, and the sixth UE being paged with the page message 98. The DL-CCHs for the five UEs are 76, 78, 82, 84, 92, and 94. At the operation 250, the network determines that there are two equal short addresses, i.e., those of the first two UEs, in the PCH page message 86. The network takes the yes branch to the function 256, and at step 256 separates the two pages into different page messages such that there are no page messages with equal short addresses. In order to do this, the network removes either the page for the first UE or the page for the second UE and moves the removed page to another page message. Since the PCH page 88 already has one short address that is the same as those for the first and second UEs, another page is chosen. Either the page messages 96 or 98 are chosen since they both have short addresses other than 0x00. The network, e.g., swaps the page record for either the first or the second UE with the page record for either the fifth or sixth UEs. The network, e.g., swaps the page records for the second and fifth UEs and rearranges the UEs into pages as follows: the first and fifth UE are paged in the page message 86, the third and fourth UEs are paged in the page message 88, the second UE is paged in the page message 96, and the sixth UE is paged in the paged message 98. The DL-CCHs for the five UEs are designated at 76, 78, 82, 84, 92, and 94.

Although the above description with respect to FIG. 12 assumes that the network has a default arrangement of pages and swaps page records based upon matching short addresses in the same PCH page message, the network also is able simply to avoid this situation in the first place by checking for duplicate short addresses before assigning UEs to particular page messages and avoiding placing duplicate short addresses in the same page message by assigning UEs with short addresses to different page messages.

It is further noted that the process set forth in FIG. 12 can result in smaller paging payloads than the process set forth in FIG. 11, but the reduced paging payload is at the price of reduced flexibility regarding the order of page messages in the frame. If there were a need for a certain order of pages in the frame that conflicted with the requirements of the process 255 shown in FIG. 12, then the process shown in FIG. 11 is used instead. Furthermore, it is noted that may sometimes be desirable to combine the processes of FIGS. 11 and 12. For example, if, in a frame there are four page messages, each page message contains four page records for a total of sixteen page records. Also, in this example, there are five short addresses of the address format 212 and associated address 222. As there are more duplicates than there are page messages, then the process set forth in FIG. 12 alone would not suffice. According to the process 244, there could be three page messages, each containing one of the five equal short addresses. This leaves a fourth page still having duplicate short addresses. For this fourth page message, the process set forth in FIG. 11 could be applied and for these two UEs a larger address would be used. For example, the address format 210 could be used and the address 218 associated therewith could also be used. By combining the processes set forth in FIGS. 11 and 12, the duplicate short addresses are eliminated, and only two addresses are needed to be longer than the shortest short address.

Figure 13:
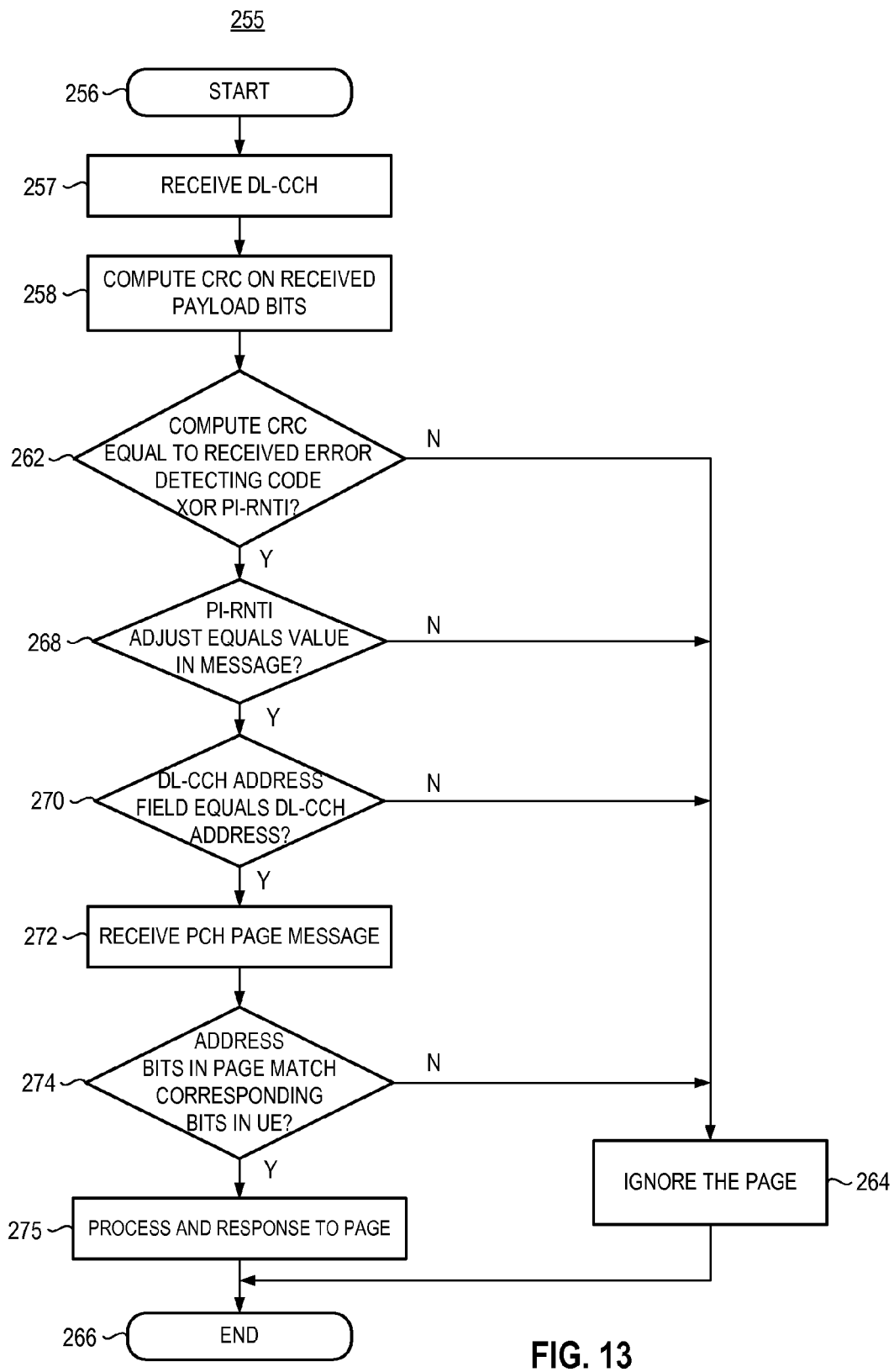
FIG. 13 illustrates a process diagram representative of the process of an exemplary embodiment of the present disclosure.

FIG. 13 illustrates a procedure 255 of an embodiment of the present disclosure by which a UE receives a page. Subsequent to the start at the start block 256, the UE receives, indicated by the block 257, a DL-CCH message sent on a DL-CCH. As indicated by the block 258, the UE computes a CRC on the received DL-CCH payload bits. Exemplary payload bits are shown in the example message 182 shown in FIG. 7.

Processing continues, and a determination is made at the decision block 262 at which the UE compares the computed CRC with the received error detecting code, such as represented by the field 192 shown in FIG. 7, exclusive-ORed with the PI-RNTI of the UE. If the result of the decision 262 is negative, processing continues at the block 264 where the UE ignores the page and then ends at the block 266.

If, conversely, the result of the operation 262 is positive, the yes branch is taken to the block 268. If there is no PI-RNTI adjusted field, then the operation 268 is not required. And, processing, instead, continues at the decision block 270 rather than the decision block 268.

At the step 268, the UE compares the PI-RNTI adjusted field from the message with its own value. If the result of the determination is negative, a path is taken to the block 264 where the UE ignores the page and then ends at the end block 266.

If, conversely, a positive determination is made at the decision block 268, processing continues at the decision block 270. The operation 270 is optional if a DL-CCH address field is not included. If a DL-CCH address is not included, processing continues at the block 272 rather than at the decision block 270. At the step 270, the UE compares the DL-CCH address field from the message with its DL-CCH address. If the result of the comparison is negative, processing continues at the block 264. Conversely, if the result of the operation 270 is positive, processing continues at the block 272. At the function 272, the UE receives the PCH page message to which it is directed by the DL-CCH. After the step 272, processing continues at the decision block 274.

At the decision block 274, the UE compares its own address bits to address bits from records of the page message. The UE determines there to be a match if one of the address fields is the same as the UE's corresponding bits. If the result of the comparison is negative, the no branch is taken to the block 264. Otherwise, if the comparison is positive, processing continues at the block 275 where the UE processes and responds to the page record of the message that had the matching address bits. Processing ends at the end block 266.

Figure 14:
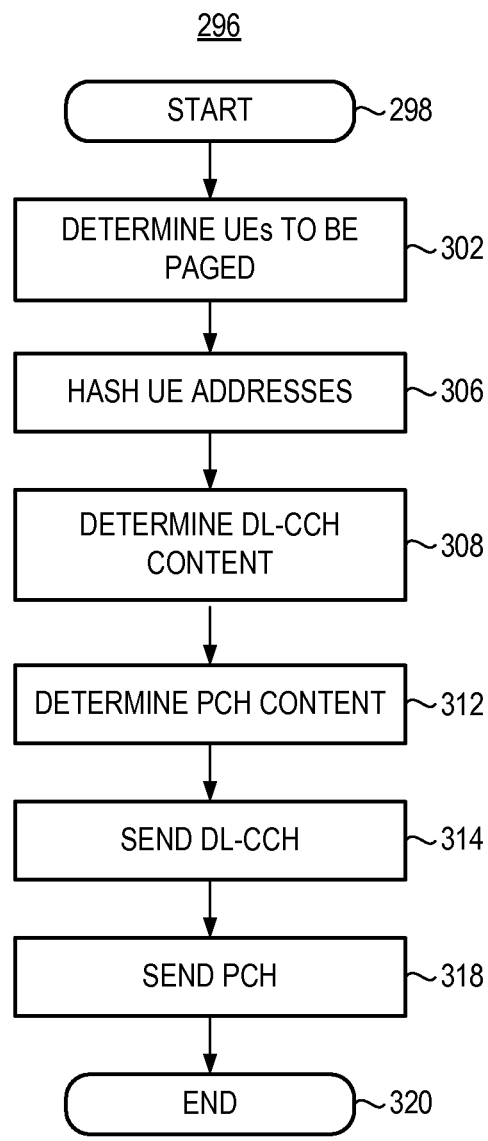
FIG. 14 illustrates a message sequence diagram representative of the method of operation of an embodiment of the present disclosure.

FIG. 14 illustrates a method flow diagram, shown generally at 296, representative of the method of operation of an embodiment of the present disclosure. The method provides a procedure to send pages in a frame. The procedure starts at the start block 298.

At the block 302, the infrastructure determines the UEs to be paged. In one implementation, the UE is paged to inform the UE of an incoming phone call or in order to deliver data to the UE pursuant to a data communication service.

Thereafter, and as indicated by the block 306, the addresses of the UE that is being paged are hashed. If more than one UE is paged, each of the addresses of each of the UEs is hashed. In one implementation, hashes are performed at an earlier time and the hashed values are stored in subsequently retrieved in substitution for the hashing of the operation 306. Then, and as indicated by the block 308, a determination is made that the DL-CCH content of the DL-CCHs in the frame. And, as indicated by the block 312, a determination is made of the PCH content.

Then, as indicated by the block 314, the DL-CCH is sent. And, as indicated by the block 318, the PCH is sent. The operations 308-318 are repeated if there are so many pages that multiple sub frames of a frame are required for the pages. Subsequent to the operation 318, the process ends, indicated by the end block 320.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for facilitating mobile-station paging, said apparatus comprising:
    a page format selector provided with groups of bits of page addresses, said page format selector configured to identify a unique page address of a mobile station, select a first bit subset of the groups of bits of the page addresses to be included in a first page message and a second bit subset of the group of bits of the page addresses included in a second page message, determine a length of each group of bits of each page address provided thereto, determine which group of bits is of a shortest length, and shorten lengths of the group of bits to be all of common lengths, wherein the unique page address is formed from the first bit subset and the second bit subset;
    a formatter configured to format the first page message and the second page message with portions selected by said page format selector of the groups of bits of the page addresses; and
    a transceiver configured to transmit the first page message using a control channel and the second page message using a physical channel different from the first channel.

2. The apparatus of claim 1 wherein said page format selector is further configured to determine whether any of the group of bits are of equal values.

3. The apparatus of claim 2 wherein said page format selector is further configured to lengthen the group of bits to be of dissimilar values.

4. A method for facilitating mobile-station paging, said method comprising:
    identifying a unique page address of a mobile station;
    selecting a first bit subset of groups of bits of page addresses to be included in a first page message and a second bit subset of the group of bits of the page addresses included in a second page message including determining a length of each group of bits of each page address provided thereto, determining which group of bits is of a shortest length, and shortening lengths of the group of bits to be all of common lengths, wherein the unique page address is formed from the first bit subset and the second bit subset; and
    formatting the first page message and the second page message with portions selected during said selecting; and
    transmitting the first page message using a control channel and the second page message using a physical channel different from the first channel.

5. The method of claim 4 wherein said selecting further comprises determining whether any of the groups of bits, once shortened, are of equal values.

6. The method of claim 4 wherein said selecting further comprises selecting which groups of bits are to be included in the first and the second page message.

7. The method of claim 4 wherein said formatting further comprises including an address type field associated with each group of bits.

* * * * *

UNITED STATES PATENT AND TRADEMARK OFFICE
CERTIFICATE OF CORRECTION

PATENT NO. : 8,644,860 B2
APPLICATION NO. : 12/013331
DATED : February 4, 2014
INVENTOR(S) : William Daniel Willey It is certified that error appears in the above-identified patent and that said Letters Patent is hereby corrected as shown below:

On Title Page, In Column 2 (Assistant Examiner), In Line 1, Delete "Omoniya-Obayanju" and insert --Omoniyi-Obayanju--, therefor.

Signed and Sealed this
Twenty-fourth Day of June, 2014

Michelle K. Lee
*Deputy Director of the United States Patent and Trademark Office*